May 28, 1940.  J. C. GRAY  2,202,000
TELESCOPE SIGHT MOUNTING
Filed Nov. 8, 1938
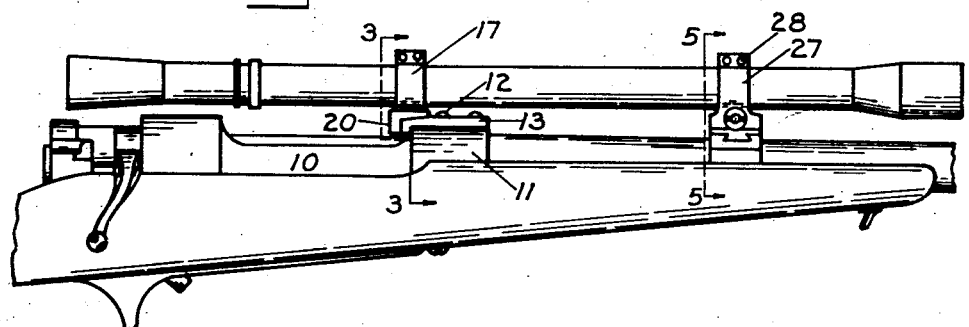
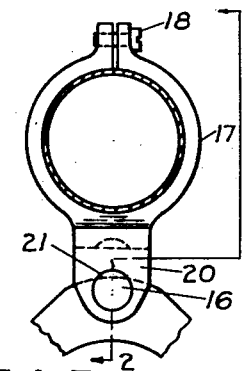
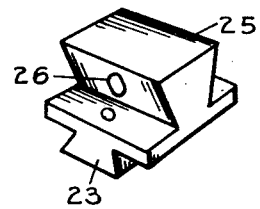
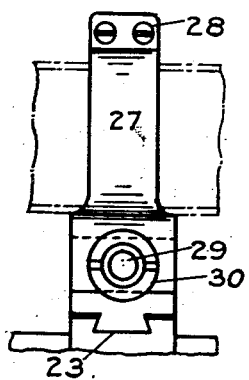
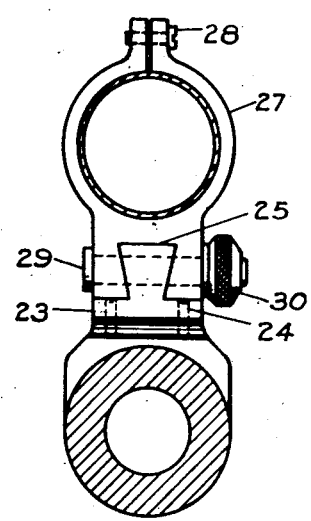
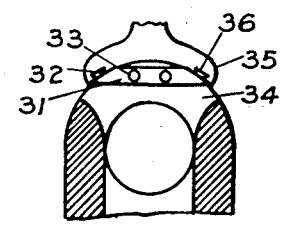
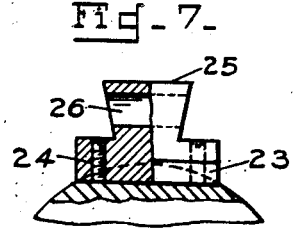
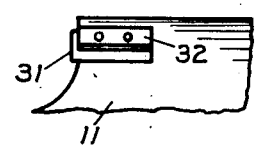
Inventor
John C. Gray
By *[signatures]*
Attorneys

UNITED STATES PATENT OFFICE 2,202,000

TELESCOPE SIGHT MOUNTING

John C. Gray, Washington, D. C.

Application November 8, 1938, Serial No. 239,513

3 Claims. (Cl. 33—50)

(Granted under the act of March 3, 1883, as amended April 30, 1928; 370 O. G. 757)

The invention described herein may be manufactured and used by or for the Government for governmental purposes, without the payment to me of any royalty thereon.

This invention is an improved telescope sight mounting, and is fully described in the following specification and illustrated in the accompanying drawing, in which:

Figure 1 is a side elevation of a rifle of the "Winchester" type to which the mountings are applied; Figure 2 is a section on the line 2—2 of Figure 3; Figure 3 is a transverse section on the line 3—3 of Figure 1; Figure 4 is a side elevation of the right side of the front mount; Figure 5 is a transverse section on the line 5 of Figure 1; Figure 6 is a perspective view of the front base; Figure 7 is a view of the front base partly in rear elevation and partly in section; and Figures 8 and 9 are respectively a rear and side elevation of a modified rear base.

It has for some time been recognized that it is desirable to mount a telescopic sight on a rifle in as low a position as possible, partly to bring the sight line on the metallic sight on the rifle and the sight line of the telescopic sight into approximately the same line, so that the rifleman can use the two types of sights interchangeably without any material change in his shooting position, and partly to avoid an undue drop from the telescope line of sight to the comb of the stock, the extreme upper position of which is, in the case of bolt-action rifles, determined by strictly mechanical considerations. In ordinary scope sight mounting systems designed for convenient removal of the telescope from the rifle, the mount which is permanently attached to the telescope always has some part which underhangs or fits beneath some other part which is permanently attached to the rifle, in order to hold the mount down in position. A very common interlock of this sort is to provide on the mount attached to the telescope a female dovetailed groove, and to provide on the rifle a base with a male dovetail. The interlock of the two dovetails fixes the vertical position of telescope.

In all the types of mounting of which I am aware, the part of the mount attached to the scope which underlies or engages beneath the part on the rifle is located above the plane of the top surface of the weapon at the point of engagement. The provision of this underlying metal of mount requires that there be considerable space between the telescope and the upper part of the weapon.

In accordance with my invention I locate the underhanging surface which inhibits vertical movement of the mount at a point below the top surface of the weapon at the point of attachment, and thus I am enabled to bring the scope clamping part of the mount closer to the top of the weapon and thus lower the line of sight.

A convenient method of accomplishing this purpose is that illustrated and herein described in detail.

Referring to Figures 1, 2 and 3, 10 indicates generally the receiver of the rifle, to the forward portion 11 of which is attached by screws 12 the rear base 13. At its rear end the rear base has an inclined surface 14 sloping downward and rearward and terminating in a lug 15, at the rear of which is a cylindrical boss 16. It will be noted that the downwardly extending lug on the base brings this cylindrical boss well below the top surface of the receiver. The lower part of the boss is brought well down into the receiver well and very close to the bolt of the weapon.

17 is the rear mount, which is relatively permanently affixed to the telescope by the clamping screws 18. The lower face of the mount is provided near the front with an inclined surface 19 adapted to engage with the rear incline 14 on the base. At its rear, the mount has a downwardly projecting lug 20 provided with a central opening 21 which fits the boss 16 on the base. The web of metal 22 at the lower part of this lug beneath the perforation 21 provides the necessary vertical interlock to prevent vertical movement upward of the mount, and this, it will be noted, is located far down in the receiver well and well below the adjacent surface of the upper part of the receiver.

By thus lowering the position of these vertically interlocking parts the whole mount is correspondingly lowered while positioning the telescope in the vertical plane containing the bore of the gun.

Since the present embodiment of the invention shows the telescope adapted to a rifle whose top surface, at the point of attachment of the front mount, is considerably lower than the top of the receiver, the principles employed at the rear mount are not required but, of course, they could be used if the exterior contour of the piece so required. Ample space being available, however, the front mount and its connections are conveniently made in the form illustrated in Figures 4 to 7, inclusive.

In the form of device illustrated in these figures, the front base is provided with a transverse male dovetailed part 23 which fits into a corresponding groove cut in a part, provided for the purpose, on the rifle barrel. The base is preferably held in position by set screws 24. The upper part of the front base is provided with a longitudinally extending male dovetail portion 25, somewhat similar to those in conventional use on target rifles but made higher, and with a transverse perforation 26. The front mount 27 is clamped to the telescope by set screws 28 and has at its lower portion a female dovetail groove to interfit with the base. A clamping screw 29 runs transversely through the base and the lower part of the mount, and the mount is firmly set in position by the clamping nut 30.

In the modification shown in Figs. 8 and 9, a U-shaped saddle including a base 31 and dovetail arms 32—32 is secured to the rifle by pins or screws 33 and is arranged so that the base 31 extends transversely across the wall 34 at the front end of the well and the arms are arranged below the adjacent upper part of the rifle. The sight mount 35 is provided with grooves 36 whereby it is assembled by a movement longitudinal of the rifle. It is, of course, understood that the tongues and grooves may be provided either on the rifle or the sight mount.

In adjusting the telescope to the rifle initially, the mounts are loosened on the telescope and are then adjusted to the bases, the telescope being moved through the mounts to bring it into proper longitudinal position, and the mounts are then tightly clamped onto the telescope so as thereafter to maintain a fixed position with respect thereto.

After this initial adjustment the telescope sight can be assembled to the rifle very simply indeed. With the clamping screw 29 removed from the front mount, the front base and mount are properly aligned, with the mount behind the base, and the telescope is started forward. As the rear mount nears its proper position, the opening in the downwardly extending lug is brought into register with the rearwardly extending circular boss of the base, and the scope is then pushed forward until the inclined surfaces of the rear mount and rear base are in correct engagement. The front mount is then clamped with the clamping screw 29.

I realize that considerable variation is possible in the details of this construction, and I do not intend to limit the invention thereto except as pointed out in the following claims, in which the intent is to claim all the novelty inherent in the construction described as broadly as is permitted by the state of the art.

I claim:

1. In a telescope sight adapted to be attached to a rifle having a receiver well, a mount permanently engaging with the sight, and a base attached to the rifle adjacent the receiver well and having a part depending into the well and interengaging means between said part and mount and located within said well whereby the mount is fixedly positioned upon the rifle.

2. In a telescopic sight adapted to be attached to a rifle having a receiver well, a mount permanently engaging with the sight, a base attached to the rifle just forward of the receiver well and having a lug depending rearwardly and downwardly into the well, a horizontal boss extending back from the lug within the well, and a corresponding lug on the mount provided with a perforation to engage the boss.

3. In a telescopic sight adapted to be attached to a rifle having a receiver well, a mount permanently engaging with the sight, a base attached to the rifle just forward of the receiver well and having a lug depending into the well, a horizontal boss extending back from the lug, a corresponding lug on the mount provided with a perforation to engage the boss, the base and mount having complemental mutually engaging surfaces adjacent the lug which slope downward and backward to fixedly position the mount on the base.

JOHN C. GRAY.